Figure 1:
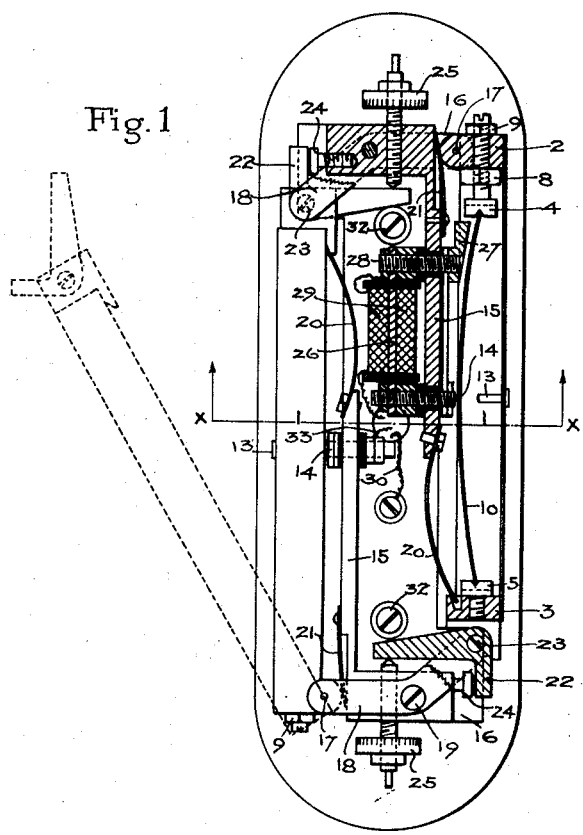

No. 887,087. PATENTED MAY 12, 1908.
H. G. GEISSINGER.
ELECTRIC THERMOSTAT.
APPLICATION FILED MAY 29, 1907.

Witnesses:
J. R. Wemlinger
Charles W. Allen

Inventor:
Harry G. Geissinger

UNITED STATES PATENT OFFICE.

HARRY G. GEISSINGER, OF NEW YORK, N. Y.

ELECTRIC THERMOSTAT.

No. 887,087.      Specification of Letters Patent.      Patented May 12, 1908.

Application filed May 29, 1907. Serial No. 376,347.

*To all whom it may concern:*

Be it known that I, HARRY G. GEISSINGER, a citizen of the United States, residing at New York city, in the county of New York and State of New York, have invented certain new and useful Improvements in Electric Thermostats, of which the following is a specification.

My invention relates to devices or apparatus for regulating and controlling temperature and more particularly to means for making such devices operative in spite of vibrations or the presence of dust or other insulating particles between contacts. The first cause tends to occasion the frequent making and breaking of the circuit with results disastrous to the apparatus, and the second cause, of course, prevents a good contact when this should exist.

A serious defect of the compound-bar type of thermostat is the inevitable tendency of the thermal bar to vibrate causing frequent opening and closing of the circuit. These rapid and persistent breaks in the regulating circuit burn and wear out the contact points and these defects alone explain the repeated failures to control temperature through the medium of electric thermostats. Even in the largest buildings in cities, there is sufficient vibration to cause this result. Another serious defect of the ordinary type of thermostat is the uncertainty of contact occasioned by the presence of minute particles of dust or oxidation between contact points. The ordinary thermal bar is, necessarily, a weak spring supported at a relatively distant base, and, when contact is made by the free end, the pressure between the contacts becomes proportional to the increase of temperature beyond the degree at which the thermostat is presumed to act. This pressure, of course, after a while is sufficient to cause the closing of the circuit even though there may be some non-conducting matter between the contacts, but, in the meantime, the closing of the circuit has been delayed beyond the temperature for which the apparatus is set.

My improved temperature controller is absolutely free from the effects of vibrations although the apparatus is sensitive to variations of temperature too minute to be recorded by a thermometer, and it may be pounded and violently shaken in any position without breaking its controlling circuit.

Furthermore, in my thermostat, the contacts are pressed together with a positive force with the first contact, and with unvarying force through any range of temperature beyond that of contact, as will be explained hereinafter.

I have shown two of my improved thermostats in combination for the purpose of regulating different temperatures, as, for instance, day and night temperatures.

Figure 3:
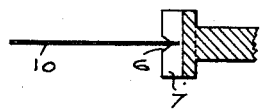
Figure 4:
Figure 5:
Figure 2:
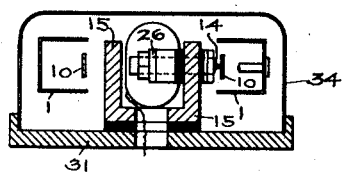
Figure 6:
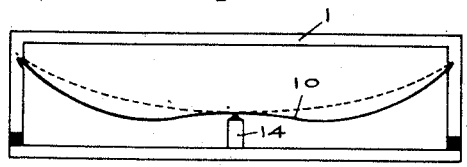
Figure 7:
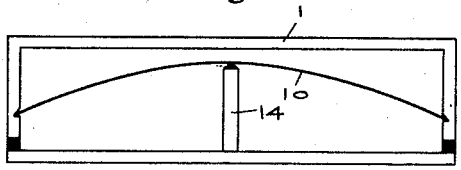

Referring to the drawings herewith, Figure 1 is a plan view, partly in section, showing the arrangement of the several parts of my thermostats; Fig. 2 is a cross-sectional view on the line $x-x$ looking in the direction of the arrows; Figs. 3, 4 and 5 are enlarged views showing the adjustable abutments and part of the arched member of my thermostat; Fig. 6 is a diagrammatic sketch showing in an exaggerated manner the shape assumed by the arched member after making contact under contraction of the fixed member; and Fig. 7 is also a diagrammatic sketch showing the action of the arched member where the contact is closed by the expansion of the fixed member.

In the drawings, 1 is a channel shaped expansible element having solid ends 2 and 3. In these ends 2 and 3 are mounted screws 4 and 5, the heads of which are provided with cross slots 6 and 7, as shown in Figs. 3, 4 and 5; the slot 6 is V-shaped while the slot 7 is square and deeper than the slot 6 and at right angles thereto. Screw 4 does not thread into the end 2, but carries the adjusting nuts 8 and 9 for the purpose of regulating the initial arching of the circuit closing member.

10 is the minor expansible element, and is of such material that its expansion under the influence of changes of temperature is so small comparatively to that of the member 1 that it is negligible. This member 10 is preferably made of spring steel and is normally straight and together with the member 1 forms the thermal couple. The adjustment of the arching of this member by means of the screw 4 effects the calibration of the apparatus, and is made at the time of manufacture by gage according to the surrounding temperature. The ends of the member 10 are each arranged with a lug or tongue 11 which fits in the slot 7 of each end screw 4 and 5, while the shoulders 12 are seated in the V-slot of the said screws. This is a very valuable and novel feature as it prevents absolutely the accidental release of the arched member 10 sidewise under the influence of abnormal expansion of the expansible element 1. At the same time, the flexible element, being held by the abutting of its extreme ends only against the adjusting screws, is entirely unrestrained in its lateral movements, and its curvature under variations of temperature is not in any way modified by the means used to secure it to the rigid element.

13 is an abutting piece which serves to prevent the accidental reversal of the member 10. This, of course, would not be required in a type of thermostat closing its circuit on a rising temperature, that is to say, one in which the member would be curved in the opposite direction, and where the expansion of the member 1 would flatten the arch and thus close the circuit as shown in Fig. 7.

14 is the contact screw, the end of which is the contact point that serves to close the electrical connection with the member 10. This contact is, preferably, an iron screw and is insulated from the frame work of the instrument. Experience has proven that the delicate temperature adjustments required in such a thermostat cannot be made by simply revolving the contact screw, and, therefore, the latter is firmly clamped upon and insulated from the frame 15.

15 is the frame which supports the several parts of the apparatus. It is provided with lugs 16 upon which rest the ends 2 and 3 of the bar 1. The end 2 is hinged to one of the lugs 16 by means of a pin 17 the upper end of which is received and held in position by the spring arm 18 partly shown in dotted lines so as to expose the parts of the apparatus under them for clearness of description. The spring arm 18 is pivoted at 19 for the purpose of providing a joint which allows a slight amount of lateral motion and which insures the correct and accurate seating of the free end 3 on its corresponding lug 16, so that it works freely yet without lost motion.

The bottom part of end 2 is pressed outwardly by the flat spring 21 which serves to eliminate all tendency of vibration or lost motion in the joint. The free end 3 is slotted to receive the right-angled lever 22 centering upon the pin 23. The free end 3 is provided with a slot which receives the end of the flat spring 20 and is removably held thereby. The inward pressure of the spring 20 is transferred from the end 3 to the pin 23 and thereby to the lever 22. The latter in turn transfers this pressure to the abutting screw 24 and the adjustable temperature screw 25. The spring 20 is loosely pivoted to the frame 15 so as to allow its being turned out from the slot in end 3 and thus release same, so that the whole thermal couple may be revolved around the pin 17 and opened for inspection or repairs, as shown in dotted lines to the left of Fig. 1. It will be noted that the joint effect of the springs 18 and 20 is to secure the end 3 against any kind of vibration or lost motion. The abutting screw 24 is made adjustable so that any irregularities in the construction of the various parts of the thermal couple may be corrected at the time of assembling.

The temperature adjusting screw 25 bears against the longer limb of the lever 22, and thus the adjustment between the contact point 14 and the member 10 is magnified to such an extent as to allow considerable motion of the screw 25 for each degree of temperature. The lever 22 is made to fit loosely upon the pin 23 so that any eccentricity of the tip of the screw 25 will not cause rocking of the thermal couple.

It is sometimes advisable or necessary that the apparatus be arranged to operate with a lag between certain limiting temperatures, that is to say, it may be desired to have the apparatus turn on the source of heat at a certain temperature and turn it off at a higher temperature, this difference being spoken of as the "lag". For this purpose a magnet is added to the thermostat. In Fig. 1, for the sake of clearness, only one of the thermostats is shown provided with one of such magnets, although each thermostat may be provided with a magnet if desired.

26 is the soft iron core of the magnet, preferably formed of a flat bar one end of which is secured to the contact screw 14 which, in this case must be of iron, and the other end to the iron screw 28. The screw 28 carries at its outer end a broad pole piece 27 which is insulated from the frame 15, as shown in Fig. 1.

29 are the coils of the magnet inserted in the regulating circuit and controlled by the contacts 14 and 10.

It will be observed that the magnetic flux is concentrated at the point of contact between the screw 14 and the member 10 where it produces the required tension. This tension is made sufficiently strong and can be regulated to delay the breaking of the circuit by the amount of the aforesaid "lag." The same magnetic flux passes from the pole 27 to the member 10, but being diffused, it creates but slight tension.

A wire 30 is common to both thermostats and is grounded on the frame 15, as shown in Fig. 1.

Referring now to the right hand thermostat, the electric current is as follows: The current flows through the wire 30 to the frame 15, then to the member 10 through the various intermediate parts of the thermal couple, thence, after contact is made, to contact screw 14, through the magnet core 26, to screw 28 and coil of magnet 29, thence outwardly to the apparatus or heater to be operated by the thermostat. Referring now to the left hand thermostat which, as seen, is not provided with a magnet, the current follows the same path to contact point 14, and leaves the apparatus through a wire 33 attached thereto.

The frame 15 is secured to the base 31 by screws 32, and entirely insulated therefrom, and the entire apparatus is preferably incased in a cover 34, as shown in Fig. 2.

As stated hereinbefore, in my thermostat the contacts are pressed together with unvarying force and this is illustrated in Fig. 6 which shows, in an exaggerated manner, the shape assumed by the arched member 10 after the contraction of the rigid member 1 produced contact between the two.

It is apparent that any alteration in the net length of the rigid member 1 produces magnified differences in the distortion of the arched member 10 from its normal plane, or its distance from the contact point 14. Thus, when contact is made, the pressure is correspondingly magnified and the result is an end thrust of the member 10 against the ends of member 1, which, however, is resisted by the shape and thickness of the part. Therefore, a further contraction of member 1 will cause member 10 to assume the shape of a double ogee curve, as shown. The resultant tension in the member 1 is thus doubled, because the pressure now is the result of the thrust of two arches instead of one, but it is not increased by any further contraction of the same within practical temperatures, as will be readily understood.

It is, of course, evident that vibrations have no influence upon the member 10, as there is no tendency to change its shape under any force acting at right angles to its plane, it being in fact a catenary curve when under pressure. Although the contact point or screw, being supported between the ends of the thermostat proper, is theoretically influenced by vibrations and gravity, it can be made practically insensitive by suitable construction.

Fig. 7 illustrates in simple shape a thermostat closing the contact by expansion of the rigid member 1, i. e., on a rising temperature. In this case, when the contacts have been made, the pressure between them is, of course, simply that due to the transverse resistance of the spring bent to that arc, and is independent of further expansion of the base. It is thus seen that, in either case, the pressure between the contacts in my thermostat is mechanical and fixed, and is not dependent upon any difference of temperature from the standard at which it is supposed to act, and this pressure is very much higher than ever produced by the old type of compound bar thermostat, and is strong enough to crush minute particles of dust and to break through films of moisture and oxidation.

What I claim is—

1. In a thermostat, a thermal couple consisting of elements having different rates of thermic expansion and contraction, the element having the higher rate being rigid and the other being flexible and normally straight.

2. In a thermostat, a thermal couple consisting of elements having different rates of thermic expansion and contraction, the element having the lower rate being normally straight and arranged to arch between the ends of the other element.

3. In a thermostat, a thermal couple consisting of elements having different rates of thermic expansion and contraction, the element having the lower rate being flat and the other being substantially channel-shaped in cross-section and substantially inclosing the flat element.

4. In a thermostat, a thermal couple consisting of elements having different rates of thermic expansion and contraction, the element having the lower rate being flat and normally straight and entirely within the other element.

5. In a thermostat, a thermal couple comprising a rigid, channel-shaped element having closed ends, and a flexible element having its extremities abutting against said closed ends and supported in the rigid element by such contact.

6. In a thermostat, a thermal couple comprising a rigid element having closed ends, a flexible, arched element having its extremities abutting against said closed ends and supported in the rigid element by such contact, and means for varying the curvature of the arched element.

7. In a thermostat, the combination of a supporting frame, a thermal couple composed of a straight and rigid element, a flexible and curved element mounted within and between the ends of the said rigid element, the said thermal couple being hinged at one end to the said supporting frame and movably attached thereto at the other end for the purpose of temperature adjustment.

8. In a thermostat, the combination of a supporting frame, a thermal couple composed of a straight and rigid element, a flexible and curved element mounted within and abutting against the ends of the said rigid element, means for varying the degree of curvature of the said flexible element, the said thermal couple being hinged at one end to the said supporting frame and movably attached thereto at the other end for the purpose of temperature adjustment.

9. In a thermostat, a thermal couple comprising a channel-shaped element having closed ends, adjusting means in said ends and a flexible element having its extremities abutting against the adjusting means and laterally unrestrained by said adjusting means.

10. In a thermostat, a thermal couple consisting of a channel-shaped element having closed ends, adjusting screws in the said ends, slots in the said screws, and an arched member abutting against the said screws and fitting within the said slots.

11. In a thermostat, a thermal couple consisting of a channel-shaped element having closed ends, adjusting screws in the said ends, a V-slot and a square slot in each of said screws, an arched flat member provided at each end with shoulders and a lug, the said shoulders resting in the said V-slot and the said lug extending into the square slot.

12. In a thermostat, a thermal couple consisting of a rigid element, a flexible element carried thereby, the said rigid element being hinged at one end and adjustably secured at the other end to a supporting frame.

13. In a thermostat, a thermal couple consisting of a channel-shaped rigid element having closed ends, a flexible element mounted within the same, the said rigid element being hinged at one end and adjustably secured at the other end to a supporting frame.

14. In a thermostat, a thermal couple consisting of a channel-shaped rigid element having closed ends, adjusting screws in the said ends, an arched flat member abutting against the said screws, the said rigid element being hinged at one end and adjustably secured at the other end to a supporting frame.

15. In a thermostat, a thermal couple hinged at one end to a supporting frame and held at the other end by a spring, a contact point secured to the said supporting frame, and means for moving the thermal couple to and from the said contact point.

16. In a thermostat, a thermal couple consisting of a rigid element and a flexible element, the said thermal couple being hinged at one end to a supporting frame and removably fastened thereto at the other end by a spring, a contact point coöperating with the said flexible element to close a circuit, and means for moving the thermal couple towards and away from the said contact point.

17. In a thermostat, the combination of a supporting frame, a thermal couple hinged at one end thereto and removably held at the other end by a spring secured to the said frame, a contact point, means for moving the thermal couple towards and away from the said contact point.

18. In a thermostat, the combination of a supporting frame, a thermal couple hinged at one end thereto and removably held at the other end by a spring loosely pivoted to the said frame, a contact point, a spring bearing on the hinged end of the said thermal couple, a lever mounted on the free end thereof, and an adjusting screw bearing on the said lever whereby the said thermal couple is moved towards and away from the said contact point.

19. In a thermostat, the combination of a supporting frame, a thermal couple hinged at one end thereto and removably held at the other end by a spring secured to the said frame, a fixed contact point, a spring bearing on the hinged end of the said couple, an angular lever with unequal legs mounted on the free end thereof, the shorter leg of the said lever bearing on an adjustable abutment mounted in the said frame, and an adjusting screw bearing on the longer leg of the said lever whereby the said thermal couple may be moved towards and away from the said contact point.

20. In a thermostat, the combination with a frame of an electromagnet having two poles, one of said poles being electrically connected with said electromagnet, a thermal couple consisting of a rigid channel-shaped element, and a flexible element loosely mounted therein, the said flexible element coöperating with the said pole to close an electric circuit.

21. In a thermostat, the combination of a supporting frame, a bipolar electromagnet mounted thereon, one pole of the said magnet forming a contact point, a thermal couple consisting of a channel-shaped element having closed ends and hinged at one end to the said supporting frame and a flexible arched element abutting against the said ends, and means for moving the said thermal couple towards and away from the said contact point.

22. In a thermostat, in combination, a frame carrying an adjustable contact, a thermal couple comprising a rigid member and a flexible member movably mounted on said frame, means for giving said flexible member an initial arching with respect to said rigid member and means for moving said couple with respect to the adjustable contact, for temperature adjustment.

In testimony whereof, I have signed my name to this specification in the presence of two subscribing witnesses, this twenty-eighth day of May, 1907.

HARRY G. GEISSINGER.

Witnesses:
EDITH J. FULLER,
FRANK V. LAWRENCE.